United States Patent
Ho et al.

(10) Patent No.: US 8,794,952 B2
(45) Date of Patent: Aug. 5, 2014

(54) APPARATUS FOR MOLDING ELECTRONIC COMPONENTS

(75) Inventors: Shu Chuen Ho, Singapore (SG); Si Liang Lu, Singapore (SG); Swee Kwong Mok, Singapore (SG); Kar Weng Yan, Singapore (SG)

(73) Assignee: ASM Technology Singapore Pte Ltd (SG)

( * ) Notice: Subject to any disclaimer, the term of this patent is extended or adjusted under 35 U.S.C. 154(b) by 55 days.

(21) Appl. No.: 13/036,074

(22) Filed: Feb. 28, 2011

(65) Prior Publication Data

US 2011/0210477 A1 Sep. 1, 2011

Related U.S. Application Data

(60) Provisional application No. 61/309,100, filed on Mar. 1, 2010.

(51) Int. Cl.
*B29C 33/00* (2006.01)

(52) U.S. Cl.
USPC ......... 425/190; 425/192 R; 249/103; 249/104

(58) Field of Classification Search
None
See application file for complete search history.

(56) References Cited

U.S. PATENT DOCUMENTS

| | | | | |
|---|---|---|---|---|
| 2,296,016 A | * | 9/1942 | Bostwick | 425/28.1 |
| 3,734,448 A | * | 5/1973 | Rusk et al. | 249/103 |
| 4,384,702 A | * | 5/1983 | Boskovic | 249/103 |
| 5,057,000 A | * | 10/1991 | Mangone, Jr. | 425/190 |
| 5,609,810 A | * | 3/1997 | Fujiwara et al. | 264/219 |
| 5,817,208 A | * | 10/1998 | Nose et al. | 156/500 |
| 5,968,564 A | * | 10/1999 | Welsh et al. | 425/577 |
| 6,149,420 A | * | 11/2000 | Kim et al. | 425/192 R |
| 6,270,712 B1 | * | 8/2001 | Shoji et al. | 264/272.17 |
| 6,869,556 B2 | * | 3/2005 | Ho et al. | 264/272.17 |
| 2002/0142058 A1 | * | 10/2002 | Tanaka et al. | 425/127 |

FOREIGN PATENT DOCUMENTS

| | | | |
|---|---|---|---|
| JP | 2000229325 | * | 8/2000 |
| JP | 2006168326 | * | 6/2006 |
| JP | 2006335010 | * | 12/2006 |

* cited by examiner

*Primary Examiner* — Edmund H. Lee
(74) *Attorney, Agent, or Firm* — Ostrolenk Faber

(57) ABSTRACT

A molding apparatus for an electronic device comprises a first mold chase, a second mold chase and a middle plate which is configured to be clamped together with the electronic device between the first mold chase and second mold chase during molding. A molding cavity formed in the middle plate is configured for receiving molding compound. A package pin is mounted on the middle plate to be movable with the middle plate, and a portion of the package pin is positioned to protrude into the molding cavity to form a mark in the molding compound when molding compound is molded around the said portion of the package pin.

4 Claims, 5 Drawing Sheets

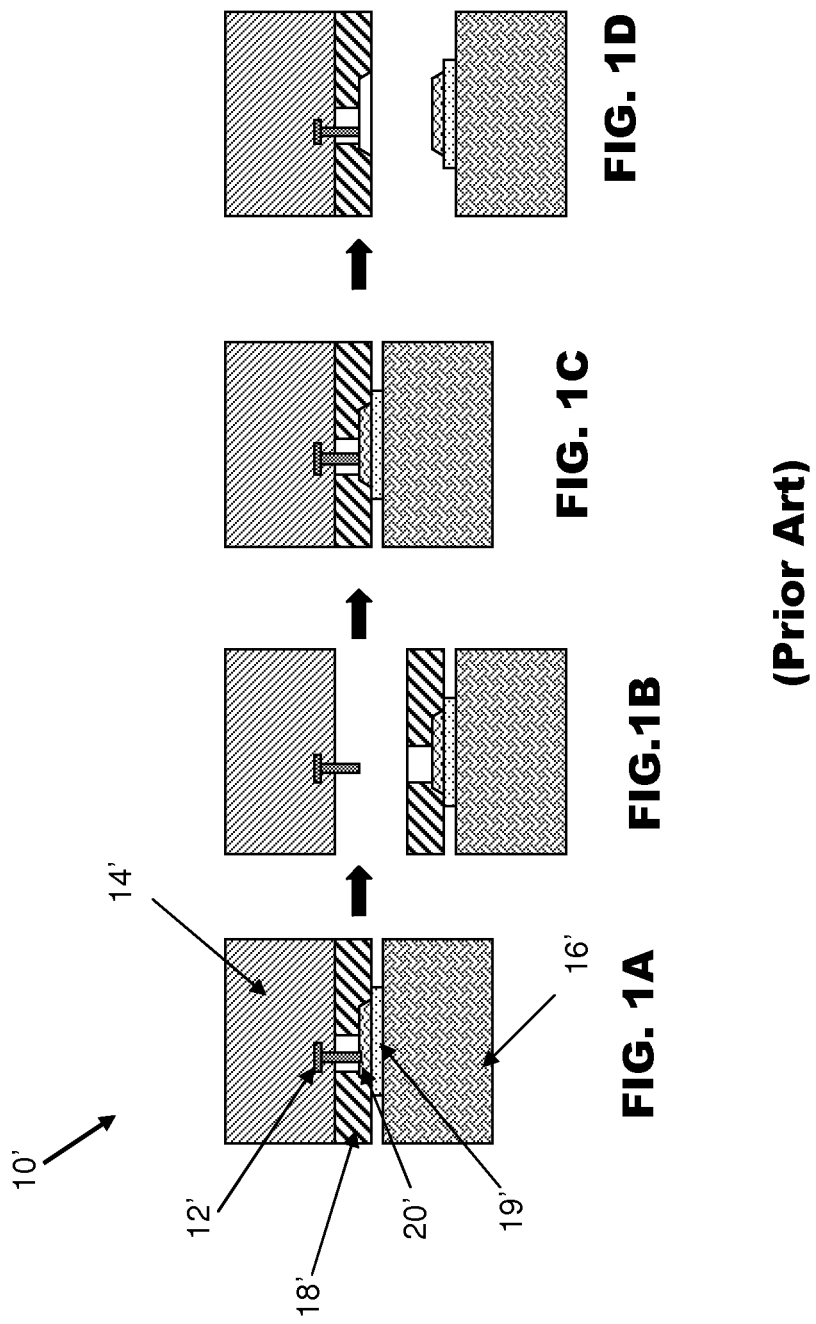

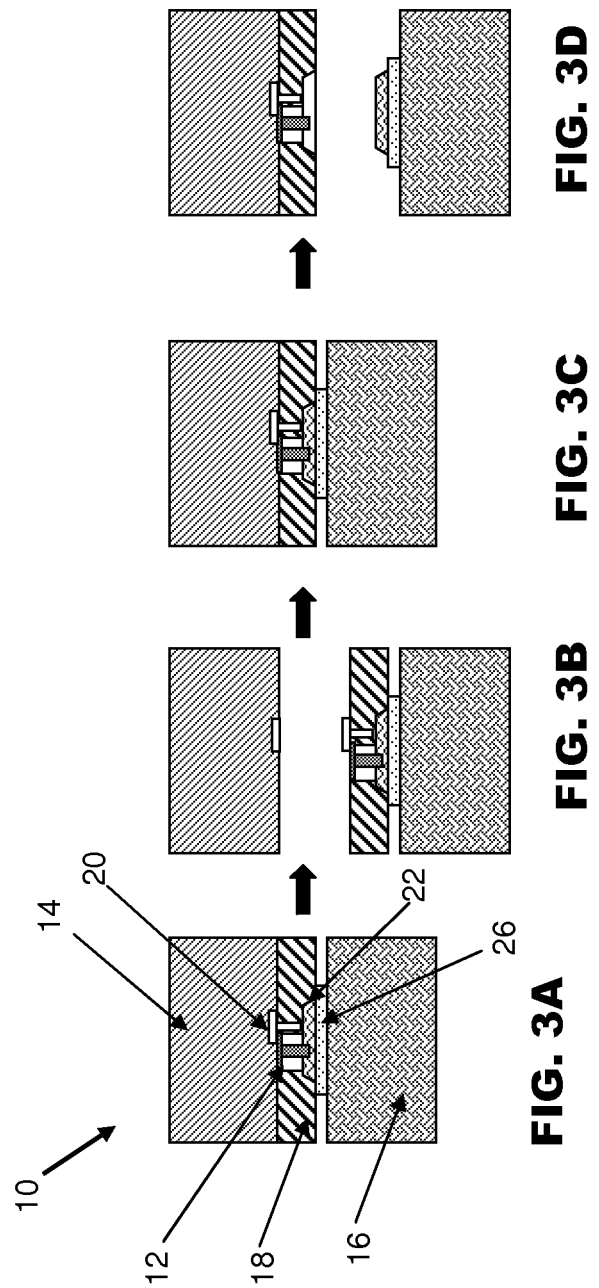

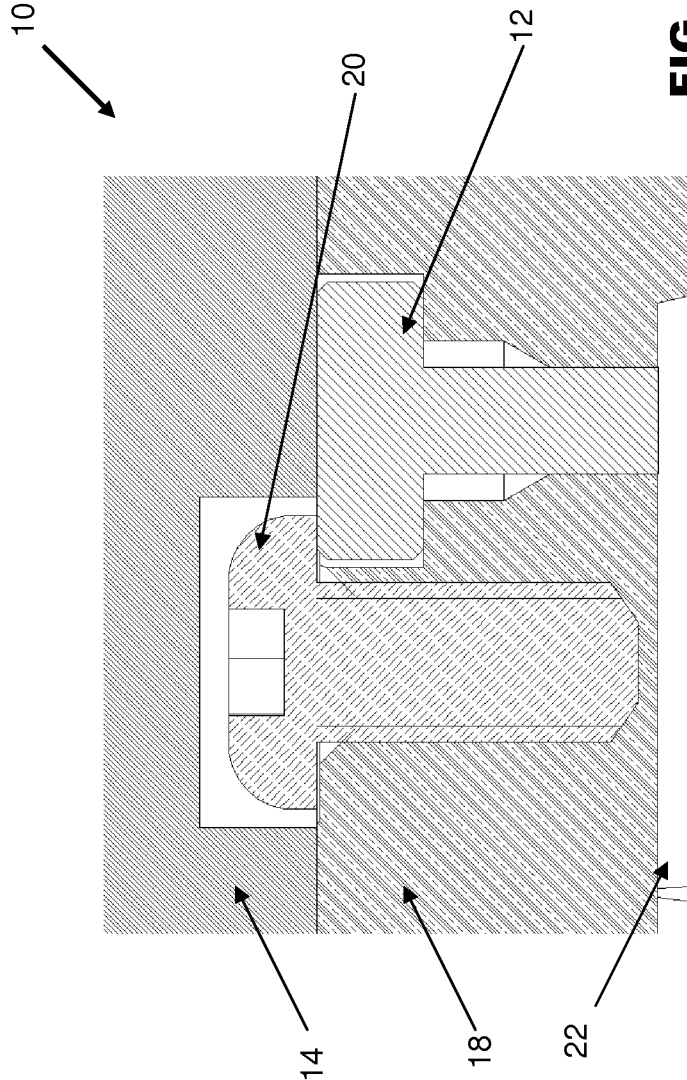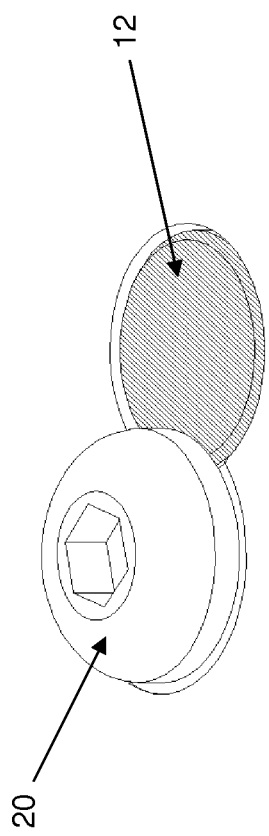
FIG. 4
FIG. 5

APPARATUS FOR MOLDING ELECTRONIC COMPONENTS

FIELD OF THE INVENTION

The invention relates to the molding of electronic devices, and in particular to a molding apparatus for molding electronic devices with reduced wastage of molding compound.

BACKGROUND AND PRIOR ART

During the assembly of semiconductor packages, semiconductor chips are often attached onto carriers, such as substrates or leadframes, for processing multiple semiconductor chips at the same time. After or during attachment, electrical connections are made between electrical pads on the chips to corresponding contacts or connection pads on the substrates or leadframes. This can be done by wire bonding, or the electrical pads can be directly attached onto the contacts on the substrates or leadframes. Thereafter, it is usually necessary to protect the chips and the electrical connections from the environment by encapsulating them in a molding compound, such as epoxy molding compound ("EMC").

In a typical transfer molding process, a substrate with the chips attached is placed into a molding system comprising top and bottom molding halves and sometimes, a middle plate. One or more molding cavities are formed in one or both of the mold halves corresponding to the positions of the chips to be encapsulated. Molding compound is introduced into mold supply pots in the molding system. The mold supply pots are linked to the molding cavities through a system of runners and gates through which the molding compound is channeled before entering the molding cavities. A plunger is insertable into each pot and the molding compound is distributed from the mold supply pot by the plunger compressing the molding compound.

After the cavities have been filled, the molding compound is allowed to set and harden. Besides molding compound that is filled into the cavities for encapsulation, excess molding compound is also created inside the mold supply pot, and in the runners and gates. The excess molding compound can be conveniently referred to as cull, runner portion and gate portion. These need to be removed and discarded before further processing of the leadframe.

FIGS. 1A to 1D are schematic cross-sectional views of a conventional molding apparatus 10' illustrating a package pin 12' for forming a fiducial mark on a molded package during a molding process. The package pin 12' is mounted to a top mold chase 14' of the molding apparatus 10', which is movable relative to a bottom mold chase 16' and a middle plate 18'. The package pin 12' contacts a surface of a molded package 20' mounted on a substrate 19', and creates fiducial markings on the surface for orientating the molded package 20'. The package pin 12' is located in the top mold chase 14' and extends from the top mold chase 14' through the middle plate 18' when the top mold chase 14' and the bottom mold chase 16' are closed. In this position, the package pin 12' slightly contacts a surface of the molded package 20' positioned on the bottom mold chase 16' to form a small dot or depression on the surface of the molded package 20'. During removal of the cull, runner portion and gate portion, the top mold chase 14' is separated from the middle plate 18' as shown in FIG. 1B. The package pin 12' located in the molding apparatus 10' is pulled away from the surface of the molded package 20' together with the top mold chase 14' in this process.

After the cull, runner portion and gate portion are removed, the top mold chase 14' closes onto the middle plate 18' and the package pin 12' contacts the surface of the molded package 20' again as in FIG. 1C. FIG. 1D shows the separation of the middle plate 18' together with the package pin 12' from the bottom mold chase 16' during removal of the molded package 20'. At the time when the top mold chase 14' closes onto the middle plate 18', the package pin 12' may create a second marking on the molded package 20' which overlaps the first marking so that the initial dot becomes less distinctive on the surface of the molded package 20'. It is therefore desirable to devise a method which avoids the package pin 12' contacting the molded package 20' a second time, in order to produce sharp fiducial markings on the surface of the molded package 20'.

As regards another aspect of the molding apparatus 10', expulsion of molded packages requires ejection pins to push molded packages away from the middle plate 18' after molding. FIGS. 2A to 2C are schematic cross-sectional views of a conventional molding apparatus 10' illustrating ejection pins 22' for pushing away molded packages after molding. The ejection pins 22' are mounted at one end to an ejection plate 24', and are guided through loose-fitting holes of a runner plate 26' towards the middle plate 18'. The ejection plate 24' is located on the molding apparatus 10' such that the ejection pins 22' extend through the top mold chase 14' and the runner plate 26', and then project through receiving holes 28' located in the middle plate 18'. After molding, the ejection pins 22' are operative to press and push out molded packages 20' mounted on a substrate 19' on the bottom mold chase 16' through the receiving holes 28' when the molding apparatus 10' is opened (see FIGS. 2B and 2C).

Generally, there is a relatively large clearance between the receiving holes 28' and the ejection pins 22'. Otherwise, the ejection pins 22' which are guided loosely by the runner plate 26' may be misaligned with the receiving holes 28' and hit the middle plate 18' when the molding apparatus 10' is being closed. This may damage the middle plate 18'. However, a substantial amount of molding compound is wasted when the molding compound enters and remains in the relatively large receiving holes 28'. Cleaning of an elastic film lining the bottom mold chase 16' would also require substantial effort because the film tends to slip into the relatively large holes 28'. It would therefore be useful to devise a way of ejecting the molded packages 20' without the excessive loss of molded compound and without having to form receiving holes 28' which are overly large and without damaging the middle plate 18' during molding.

SUMMARY OF THE INVENTION

It is thus an object of the invention to seek to devise a molding apparatus for forming clear markings on molded packages and for more efficient molding while reducing wastage of molding compound.

According to a first aspect of the invention, there is provided a molding apparatus for an electronic device, comprising: a first mold chase, a second mold chase and a middle plate which is configured to be clamped together with the electronic device between the first mold chase and second mold chase during molding; a molding cavity formed in the middle plate for receiving molding compound; and a package pin mounted on the middle plate and movable with the middle plate, a portion of the package pin being positioned to protrude into the molding cavity to form a mark in the molding compound when molding compound is molded around the said portion of the package pin.

According to a second aspect of the invention, there is provided a method of molding an electronic device, comprising the steps of: positioning the electronic device between a middle plate and a first mold chase of a molding apparatus; clamping the electronic device and middle plate between the first mold chase and a second mold chase; introducing molding compound into a molding cavity located in the middle plate, wherein the molding compound is molded around a portion of a package pin mounted on the middle plate which partially protrudes into the molding cavity; separating the second mold chase from the middle plate to remove cull while the package pin is fixedly secured to the middle plate; closing the second mold chase onto the middle plate; and thereafter separating the second mold chase and middle plate from the first mold chase, and removing the electronic device which has been molded.

According to a third aspect of the invention, there is provided a molding apparatus for an electronic device, comprising: a first mold chase, a second mold chase and a middle plate including a molding cavity which is configured to be clamped between the first mold chase and second mold chase during molding; at least one ejection pin extending from the first mold chase towards the bottom mold chase; at least one receiving hole in the middle plate which is sized to allow the ejection pin to pass through the middle plate to contact a molded electronic device positioned on the second mold chase; and a holding bush located at a base of the first mold chase through which the ejection pin is configured to pass; wherein the holding bush is at least partially insertable into the receiving hole for guiding the ejection pin precisely into the receiving hole.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of the preferred embodiment of the invention when considered with the accompanying drawings, in which:

FIGS. 1A to 1D are schematic cross-sectional views of a conventional molding apparatus illustrating a package pin for forming a fiducial mark on a molded package during a molding process;

FIGS. 3A to 3D are schematic cross-sectional views of a molding apparatus illustrating a package pin which is mounted to a middle plate of the molding apparatus;

FIG. 4 is a cross-sectional view of a portion of the molding apparatus illustrating the package pin which is held by a fixer;

FIG. 5 is an isometric top view of the package pin and the fixer; and

DETAILED DESCRIPTION OF THE PREFERRED EMBODIMENT OF THE INVENTION

Figure 2C:
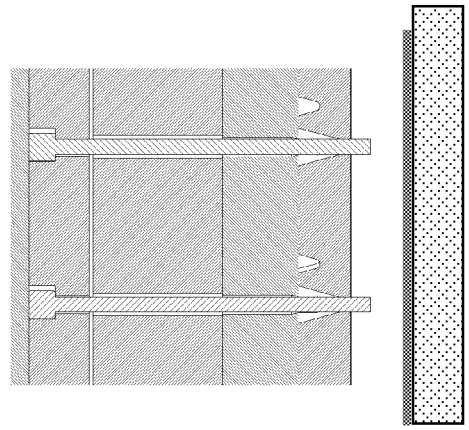
FIGS. 2A to 2C are schematic cross-sectional views of a conventional molding apparatus illustrating ejection pins for pushing away molded packages after molding.
Figure 2B:
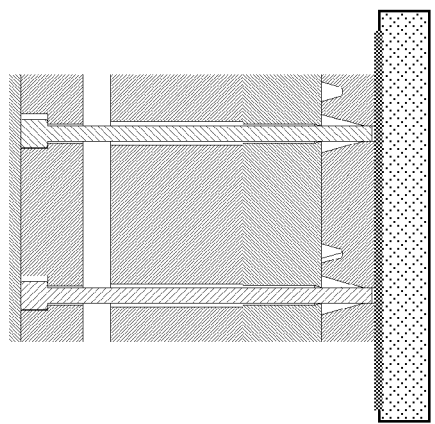
Figure 2A:
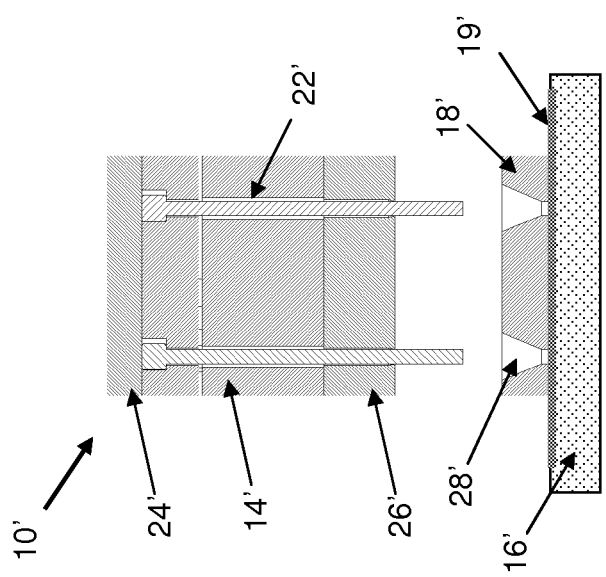

FIGS. 3A to 3D are schematic cross-sectional views of a molding apparatus 10 illustrating a package pin 12 which is mounted to a middle plate 18 of the molding apparatus 10. The middle plate 18 includes a molding cavity for receiving molding compound where an electronic device or package 22 is to be molded, and the middle plate 18 and package 22 are configured to be clamped between a top mold chase 14 and a bottom mold chase 16 during molding. The package pin 12 is mounted to the middle plate 18 and is movable with the middle plate 18 instead of the top mold chase 14 as in the conventional molding apparatus 10'.

The package pin 12 is secured to the middle plate 18 by a fixer 20 or fixing screw which is also located on and mounted to the middle plate 18. The fixer 20 includes a flat head portion abutting an end of the package pin 12, which in this configuration is on top of and covers a top of the package pin 12, for securing the package pin 12 to the middle plate 18. The fixer 20 may further have a threaded stem portion for screwing it into the middle plate. A portion of the package pin 12 is positioned to protrude into the molding cavity so that molding compound is configured to be molded around the portion of the package pin 12 protruding into the molding cavity during molding.

FIG. 3A shows the molding apparatus 10 with the top mold chase 14 and bottom mold chase 16 closed. A substrate 26 comprising a molded package 22 is located on the bottom mold chase 16 between the bottom mold chase 16 and the middle plate 18. The package pin 12 is held in position by the fixer 20, which overlaps the package pin 12 in order to secure it to the middle plate 18. Molding compound is then introduced into the molding cavity located in the middle plate 18 and allowed to harden.

FIG. 3B shows the molding apparatus 10 opened with the top mold chase 14 and middle plate 18 separated so as to remove the cull, as well as runner portion and gate portion, after molding. The package pin 12 remains fixed on the middle plate 18 while secured by the fixer 20. FIG. 3C shows the molding apparatus 10 with the top and bottom mold chases 14, 16 closed again onto the middle plate 18. Since the package pin 12 resides in the middle plate 18, it does not break its contact with the surface of the molded package 22 when the top mold chase 14 is lifted for removing the cull formed. In this way, the package pin 12 does not have to separate from and then re-enter the middle plate 18 as in the conventional molding apparatus 10'. No further markings are made on the surface of the molded package 22 other than the first marking. Consequently, a clear and distinctive fiducial marking is left on the molded package 22.

FIG. 3D shows the molding apparatus 10 open, wherein the top mold chase 14 and the middle plate 18 are separated from the molded package 22 so that the molded package 22 may be removed. The package pin 12 held on the middle plate 18 breaks away from contact with the molded package 22. Using the aforesaid process, only one clear and distinctive marking is made on the surface which is useful as a fiducial marking for visual recognition or visual alignment.

FIG. 4 is a cross-sectional view of a portion of the molding apparatus 10 illustrating the package pin 12 which is held by the fixer 20. The package pin 12 is located in the middle plate 18 and is held by the fixer 20 which is screwed on top of it. The package pin 12 contacts the surface of the molded package 22 at only one fixed point during the whole molding process.

FIG. 5 is an isometric top view of the package pin 12 and the fixer 20. The fixer 20 partially covers the package pin 12 so as to secure the package pin 12 to the middle plate 18 to contact the molded package 22 at only one point during molding.

Figure 6A:
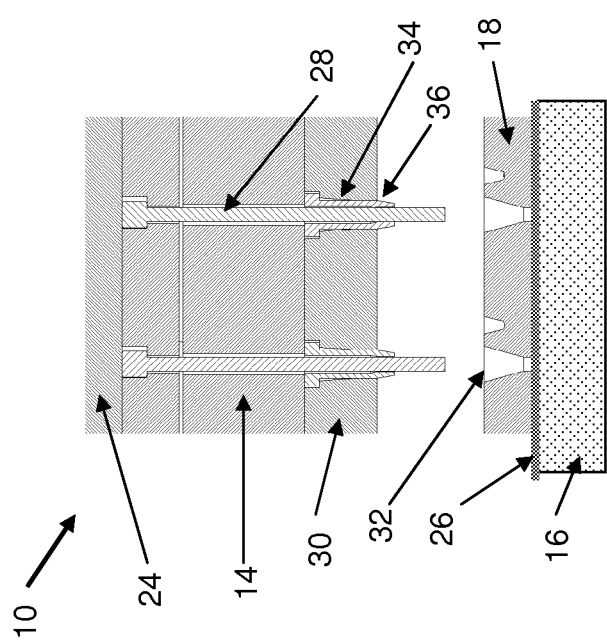
FIGS. 6A to 6C are schematic cross-sectional views of the molding apparatus including holding bushes according to the preferred embodiment of the invention for guiding ejection pins to push away molded packages after molding.
Figure 6B:
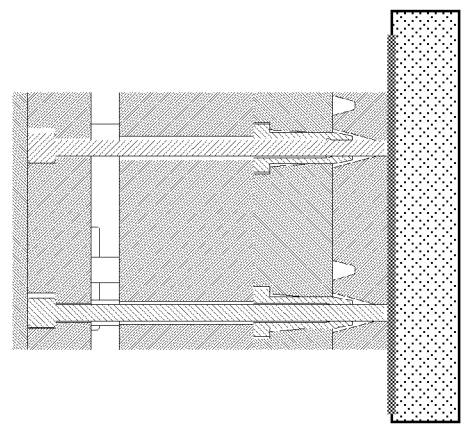
Figure 6C:
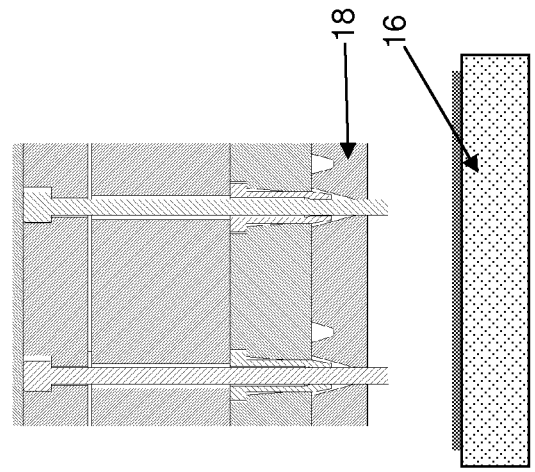

FIGS. 6A to 6C are schematic cross-sectional views of the molding apparatus 10 including holding bushes 34 according to the preferred embodiment of the invention for guiding a plurality of ejection pins 28 to push away molded packages after molding. The top mold chase 14 includes an ejection plate 24 and runner plate 30 next to the top mold chase 14. The ejection pins 28 extend from the top mold chase 14 towards the bottom mold chase 16. The ejection plate 24 presses on the plurality of ejection pins 28 which extend through the top mold chase 14 and the runner plate 30 through connecting holes in the top mold chase 14 and the runner plate 30. The middle plate 18 has a plurality of ejection pin receiving holes 32 to receive an ejection pin 28 each. The runner plate 30 further contains runners for channeling molding compound to the molding cavity.

There are a number of runner plate holes 36 at a base of the top mold chase 14 which the ejection pins 28 pass through. Each runner plate hole 36 incorporates a hollow holding bush 34 which protrudes from the runner plate 30 to be at least partially insertable into the ejection pin receiving holes 32 to be closer to the bases of the ejection pin receiving holes 32. To aid insertion, a part of the holding bush 34 which protrudes from the runner plate 30 is substantially frustoconically-shaped. The holding bush 34 provides a guide to the ejection pin 28 which passes through the holding bush 34. The ejection pin 28 is therefore guided into the ejection pin receiving holes 32 with greater accuracy and is unlikely to hit and damage the middle plate 18 around the areas where the ejection pin receiving holes 32 are located. The holding bush 34 provides a useful guiding means through which the ejection pins 28 may enter the ejection pin receiving holes 32 more precisely.

It is therefore not necessary to provide larger ejection pin receiving holes 32 for accurate entry of the ejection pins 28. Less molding compound enters the smaller receiving holes 32, which reduces wastage of the molding compound.

FIG. 6B shows the mold chase in a closed state when the runner plate 30 contacts the middle plate 18. Each holding bush 34 is adjacent to a corresponding ejection pin receiving hole 32 in the middle plate 18, thus guiding the ejection pins 28 accurately into the ejection pin receiving holes 32. FIG. 6C shows the middle plate 18 separated from the substrate 26 and the bottom mold chase 16. Next, the ejection pins 28 project out of the receiving holes 32 and push the molded packages 22 and the substrate 26 away from the middle plate 18. The substrate 26 and the molded packages 22 are unclamped and resting on the bottom mold chase 16, and are subsequently transported away.

It would be appreciated that fixing the package pin 12 to the middle plate 18 instead of to the top mold chase 14 prevents contact of the package pin 12 on the surface of the molding package 22 multiple times during molding. A clear fiducial marking can be formed for visual identification or other purposes. Furthermore, the holding bush 34 engages each ejection pin 28 such that the ejection pin 28 can enter the ejection pin receiving hole 32 precisely without the need to have larger receiving holes 32 for insertion of the ejection pins 28. Amongst other things, this reduces molding compound trapped in the receiving holes 32 and thus reduces wastage.

The invention described herein is susceptible to variations, modifications and/or additions other than those specifically described and it is to be understood that the invention includes all such variations, modifications and/or additions which fall within the spirit and scope of the above description.

The invention claimed is:

1. A molding apparatus configured to encapsulate an electronic device in a molding compound to form a molded semiconductor package, the molding apparatus comprising:
   a first mold chase, a second mold chase and a middle plate which are configured to be clamped together with the electronic device, the middle plate being arranged between the first mold chase and second mold chase during molding;
   a molding cavity wholly defined by a cavity formed on one side of the middle plate for receiving molding compound; and
   a package pin mounted onto the middle plate and movable with the middle plate relative to both the first and second mold chases during a molding process, a portion of the package pin being positioned to protrude into the molding cavity to form a mark in the molding compound when molding compound is molded around the said portion of the package pin.

2. The molding apparatus as claimed in claim 1, further comprising a fixer mounted on the middle plate, wherein the fixer includes a head portion abutting against a head portion of the package pin to secure the package pin to the middle plate.

3. The molding apparatus as claimed in claim 2, wherein the fixer comprises a fixing screw having a threaded stem portion for mounting the fixer to the middle plate.

4. The molding apparatus as claimed in claim 3, wherein the head portion of the fixer covers a head portion of the package pin.

* * * * *